US011473495B2

(12) United States Patent
Sethi et al.

(10) Patent No.: US 11,473,495 B2
(45) Date of Patent: Oct. 18, 2022

(54) SYSTEM AND METHOD FOR RETROFITTING A POWER GENERATION SYSTEM TO INCORPORATE CLUTCHLESS SYNCHRONOUS CONDENSING

(71) Applicant: GENERAL ELECTRIC COMPANY, Schenectady, NY (US)

(72) Inventors: Vineet Sethi, Sugar Land, TX (US); Randall John Kleen, Channelview, TX (US); Tho Vankhanh Nguyen, Cypress, TX (US); Douglas Alan Jones, Bellaire, TX (US)

(73) Assignee: General Electric Company, Schenectady, NY (US)

( * ) Notice: Subject to any disclaimer, the term of this patent is extended or adjusted under 35 U.S.C. 154(b) by 58 days.

(21) Appl. No.: 16/845,067

(22) Filed: Apr. 9, 2020

(65) Prior Publication Data

US 2021/0317781 A1   Oct. 14, 2021

(51) Int. Cl.
   *F02C 3/04*       (2006.01)
   *F02C 9/26*       (2006.01)
   (Continued)

(52) U.S. Cl.
   CPC ............... *F02C 3/04* (2013.01); *F01D 15/10* (2013.01); *F02C 9/26* (2013.01); *F16D 3/78* (2013.01); *H02K 7/003* (2013.01); *H02K 7/1823* (2013.01); *F05D 2220/32* (2013.01); *F05D 2220/766* (2013.01); *F05D 2230/60* (2013.01);
   (Continued)

(58) Field of Classification Search
   CPC ...... F02C 3/04; F02C 9/26; F02C 7/36; F01D 25/20; F01D 15/10; F16D 3/72; F16D 3/78; H02K 7/003; F05D 2220/32; F05D 2220/7642; F05D 2220/766; F05D 2230/60; F05D 2230/70; F05D 2240/35; F05D 2240/60; F05D 2260/40; F05D 2260/98; H02J 3/1885; Y02E 40/30
   See application file for complete search history.

(56) References Cited

U.S. PATENT DOCUMENTS 2,688,704 A   9/1954 Christenson
2,892,524 A   6/1959 Sinclair
(Continued)

FOREIGN PATENT DOCUMENTS

CN   204113964 U   1/2015

OTHER PUBLICATIONS

European Extended Search Report for EP Application No. 21167504.6-1004 dated Aug. 19, 2021; 8 pgs.
(Continued)

*Primary Examiner* — Loren C Edwards
(74) *Attorney, Agent, or Firm* — Fletcher Yoder, P.C.

(57) ABSTRACT

A system includes a clutchless synchronous condensing coupling configured to couple a turbine shaft of a gas turbine system to a generator shaft of a synchronous generator of a power generation system. The clutchless synchronous condensing coupling includes a first coupling portion configured to couple to the turbine shaft, and a second coupling portion configured to couple to the generator shaft. The clutchless synchronous condensing coupling is configured to allow the power generation system to operate in an active power mode and a reactive power mode without a clutch assembly.

22 Claims, 5 Drawing Sheets

(51) Int. Cl.
  *F16D 3/78* (2006.01)
  *H02K 7/00* (2006.01)
  *H02K 7/18* (2006.01)
  *F01D 15/10* (2006.01)
  *H02J 3/18* (2006.01)

(52) U.S. Cl.
  CPC ...... *F05D 2230/70* (2013.01); *F05D 2240/35* (2013.01); *F05D 2240/60* (2013.01); *F05D 2260/40* (2013.01); *F05D 2260/98* (2013.01); *H02J 3/1885* (2013.01)

(56) References Cited

U.S. PATENT DOCUMENTS

| | | | |
|---|---|---|---|
| 3,563,354 A | | 2/1971 | Sigg |
| 3,589,488 A | | 6/1971 | Clements |
| 3,733,095 A | | 5/1973 | Sinclair et al. |
| 3,868,004 A | | 2/1975 | Clements et al. |
| 5,311,062 A | | 5/1994 | Farkas |
| 5,325,042 A | | 6/1994 | Murugan |
| 5,610,500 A | | 3/1997 | Giberson |
| 5,886,505 A | | 3/1999 | Giberson |
| 6,093,975 A | | 7/2000 | Peticolas |
| 6,126,549 A | * | 10/2000 | Appell ............... F01D 21/006 464/24 |
| 6,140,803 A | | 10/2000 | Hurley et al. |
| 6,897,577 B2 | | 5/2005 | Weeber et al. |
| 8,008,795 B2 | | 8/2011 | Turner et al. |
| 8,816,521 B2 | | 8/2014 | Kleen et al. |
| 8,963,350 B1 | | 2/2015 | Boulden et al. |
| 9,350,225 B2 | | 5/2016 | Gieras et al. |
| 9,677,430 B2 | | 6/2017 | Sackmann et al. |
| 9,752,509 B2 | | 9/2017 | Clayton et al. |
| 10,125,628 B2 | | 11/2018 | Nguyen et al. |
| 10,132,362 B2 | | 11/2018 | Fujiwara |
| 2004/0008010 A1 | | 1/2004 | Ebrahim et al. |
| 2004/0159524 A1 | | 8/2004 | Carpenter et al. |
| 2009/0096212 A1 | | 4/2009 | Turner et al. |
| 2010/0052442 A1 | | 3/2010 | Savant |
| 2010/0056315 A1 | | 3/2010 | Scholte-Wassink |
| 2012/0104754 A1 | | 5/2012 | Rudolf et al. |
| 2012/0306458 A1 | | 12/2012 | Fogarty et al. |
| 2015/0123623 A1 | | 5/2015 | Gulen et al. |
| 2016/0036230 A1 | | 2/2016 | Day |
| 2016/0053691 A1 | | 2/2016 | Ernst |
| 2016/0105078 A1 | | 4/2016 | Santini et al. |
| 2018/0094550 A1 | | 4/2018 | Conlon |
| 2018/0142741 A1 | | 5/2018 | Sethi |
| 2018/0212492 A1 | | 7/2018 | Sethi et al. |
| 2018/0298777 A1 | * | 10/2018 | Nguyen ................ F02C 7/06 |

OTHER PUBLICATIONS

Mancuso, Jon R., Altra Industrial Motion, "Disc vs Diaphragm Couplings", Machine Design, Jul. 1986, 8 pgs.

* cited by examiner

SYSTEM AND METHOD FOR RETROFITTING A POWER GENERATION SYSTEM TO INCORPORATE CLUTCHLESS SYNCHRONOUS CONDENSING

BACKGROUND

The present disclosure relates generally to a power generation system having a generator driven by a gas turbine engine, and more specifically to synchronous condensing.

A power generation system often includes a clutch assembly between a generator and a gas turbine system. The clutch assembly enables selective engagement and disengagement between shafts of the generator and the gas turbine system. However, a clutch assembly can increase costs associated with servicing, replacement parts, and downtime of the power generation system. Unfortunately, the clutch assembly may be installed in an existing power generation system having the gas turbine system and the generator already mounted in set positions on a foundation (i.e., a pre-existing footprint), wherein a control system is specifically designed for various modes of operation using the clutch assembly. A need exists for a system and method for retrofitting an existing power generation system to operate without a clutch assembly, while enabling various modes of operation of the power generation system (e.g., an active power mode having a synchronous generator operating to generate power for a power grid, and a reactive power mode having the synchronous generator operating as a synchronous condenser to stabilize the power grid). In particular, a need exists for such a retrofit without requiring substantial changes to the pre-existing footprint, i.e., without requiring any substantial movement of the gas turbine system and the generator from their set positions on the foundation.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In accordance with an embodiment, a system includes a clutchless synchronous condensing coupling configured to couple a turbine shaft of a gas turbine system to a generator shaft of a synchronous generator of a power generation system. The clutchless synchronous condensing coupling includes a first coupling portion configured to couple to the turbine shaft, and a second coupling portion configured to couple to the generator shaft. The clutchless synchronous condensing coupling is configured to allow the power generation system to operate in an active power mode and a reactive power mode without a clutch assembly.

In accordance with an embodiment, a power generation system includes a gas turbine system, a synchronous generator, a clutchless synchronous condensing coupling, a plurality of bearings, and a sump evacuation system. The gas turbine system includes a compressor, a combustor configured to produce a flow of combustion gas, a first turbine driven by the flow of combustion gas, and a second turbine driven by the flow of combustion gas downstream from the first turbine. A first shaft of the first turbine is not rotationally coupled to a second shaft of the second turbine. The synchronous generator is configured to operate in an active power mode and a reactive power mode. The clutchless synchronous condensing coupling is provided to couple the second shaft to a generator shaft of the synchronous generator. The clutchless synchronous condensing coupling is configured to transfer torque from the second shaft to the generator shaft to drive the synchronous generator in the active power mode to provide an active power to a power grid. The clutchless synchronous condensing coupling is configured to transfer torque from the generator shaft to the second shaft when the synchronous generator is operating as a synchronous condenser in the reactive power mode to generate a reactive power or absorb a reaction power. The plurality of bearings is configured to support the first shaft, the second shaft, the generator shaft, or a combination thereof. The sump evacuation system is configured to operate in a first mode during the active power mode and to operate in a second mode during the reactive power mode, wherein the sump evacuation system is configured to flow a lubricant to the plurality of bearings.

In accordance with an embodiment, a method of retrofitting a power generation system includes removing a clutch assembly between a synchronous generator and a second turbine downstream of a first turbine of a gas turbine system, wherein a first shaft of the first turbine is not rotationally coupled to a second shaft of the second turbine. The method also includes installing a clutchless synchronous condensing coupling that couples the first shaft and a generator shaft of the synchronous generator. The method further includes installing a controller or updating an existing controller to operate the power generation system in an active power mode and a reactive power mode using the clutchless synchronous condensing coupling without the clutch assembly.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The disclosed embodiments provide a system and process for retrofitting a power generation system to incorporate a clutchless synchronous condensing system. As set forth in detail below, retrofitting existing power generation systems may include removing a clutch assembly from the power generation system and replacing the clutch assembly with a clutchless synchronous condensing coupling configured to couple a generator shaft of a synchronous generator to a turbine shaft of the gas turbine engine. Further, retrofitting existing power generation systems may include additional modifications and updates to a controller, a sump evacuation system (e.g., incorporation of a pump), as well as other systems.

Figure 1:
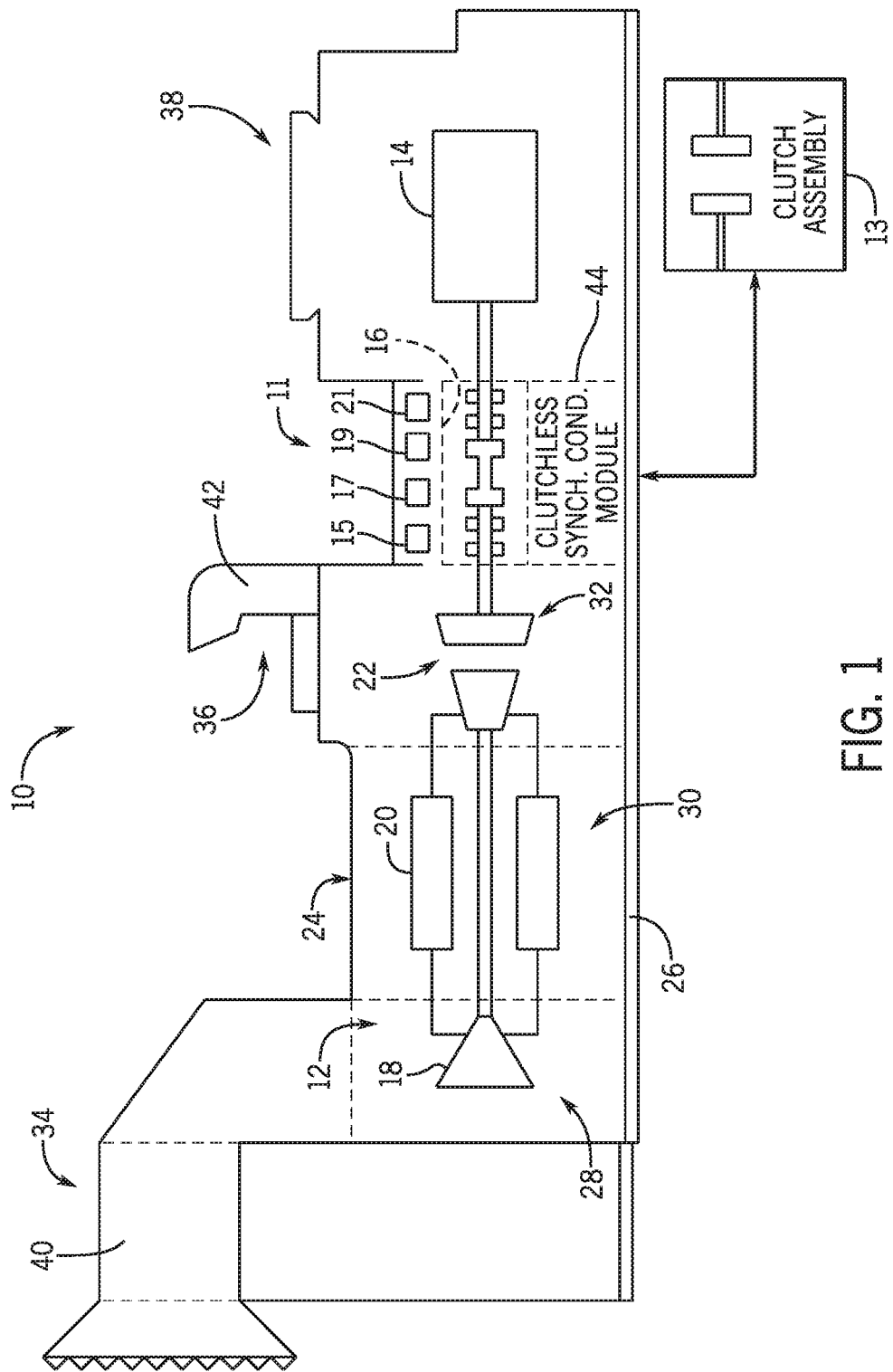
FIG. 1 is a schematic of an embodiment of power generation system having a clutchless synchronous condensing module replacing a clutch assembly in accordance with an embodiment of the present disclosure.

FIG. 1 is a schematic of an embodiment of a power generation system 10 having a clutchless synchronous condensing module 11 disposed between a gas turbine system 12 (or gas turbine engine) and a synchronous generator 14 (or generator/condenser). As discussed in detail below, the clutchless synchronous condensing module 11 includes a clutchless synchronous condensing coupling 16 (e.g., a rotational coupling). The clutchless synchronous condensing module 11 may be designed as part of a retrofit kit for a previously installed power generation system 10 and/or as part of the original equipment (e.g., a part of the overall power generation system 10). As part of a retrofit kit, the clutchless synchronous condensing module 11 is configured to add clutchless synchronous condensing capability to a previously installed power generation system 10 (e.g., equipped with a clutch and/or without synchronous condensing capabilities) by replacing a clutch assembly or module 13 with the clutchless synchronous condensing module 11. In certain embodiments, the clutchless synchronous condensing module 11 is designed to fit in the same space previously occupied by the clutch assembly 13, thereby avoiding changes to the final operating positions of the other major components of the power generation system 10.

The gas turbine system 12 may include a compressor section having one or more compressors or compressor stages 18, a combustor section having one or more combustors 20, and a turbine section having one or more turbines or turbine stages 22. The gas turbine system 12 and the synchronous generator 14 may be disposed within a power generation system housing 24. The power generation system housing 24 may be fixed to a foundation 26. The power generation system housing 24 may include housing portions for each component of the gas turbine system 12. For example, the power generation system housing 24 may have a compressor housing portion 28 configured to house the compressor 18, a combustor housing portion 30 configured to house the combustor 20, and a turbine housing portion 32 configured to house the turbine 22. In some embodiments, various housing portions of the power generation system housing 24 may be configured to house multiple components of the gas turbine system 12. The power generation system housing 24 may also include or house other components, such as an air intake system 34, a controller, a turbine ventilation system 36 (e.g., one or more fans in a ventilation duct) for the gas turbine system 12, a generator ventilation system 38 (e.g., one or more fans in a ventilation duct) for the synchronous generator 14, a filter assembly having one or more filters 40 in the intake system 34, an exhaust stack 42, an engine lubrication system, a start system, a hydraulic system, electric power and data, or some combination thereof.

In certain embodiments, a previously installed power generation system 10 may be retrofitted by removing the previously installed connection (e.g., the clutch assembly 13) between the turbine 22 and the synchronous generator 14 and replacing the clutch assembly 13 with the clutchless synchronous condensing module 11 without any significant changes to the installed positions of the housing 24, the gas turbine system 12, and the synchronous generator 14 on the foundation 26. In other words, the gas turbine system 12 and the synchronous generator 14 may remain in their installed positions on the foundation 26, while the clutchless synchronous condensing module 11 fills the space previously occupied by the clutch assembly 13. In certain embodiments, the clutchless synchronous condensing module 11 may be sized specifically to fit in the space occupied by the clutch assembly 13 or the clutchless synchronous condensing module 11 may have a base size combined with size adjustment features to enable a proper fit between the turbine 22 and the synchronous generator 14. For example, the clutchless synchronous condensing module 11 may include adjustable housing panels to increase and/or decrease a height, width, or length of the module 11 depending on available space. By further example, the clutchless synchronous condensing module 11 may include adjustable features on the clutchless synchronous condensing coupling 16, such an axial adjustment assembly on the coupling 16 and/or associated shaft. The axial adjustment assembly of the coupling 16 may enable adjustments to increase or decrease an axial length of the clutchless synchronous condensing coupling 16 and its associated shaft. For example, the axial adjustment assembly may include resilient connections, expandable/contractible shaft sections, spacers, or any combination thereof. In this manner, the size adjustment features help to enable the clutchless synchronous condensing module 11 to be efficiently installed in the available space previously occupied by the clutch assembly 13. The overall footprint of the power generation system 10 generally remains the same when the clutchless synchronous condensing module 11 replaces the clutch assembly 13. By fitting the clutchless synchronous condensing module 11 in the same space as the clutch assembly 13, the disclosed embodiments enable a more efficient retrofit with substantially reduced downtime of the power generation system 10. In contrast, without the disclosed embodiments, the retrofit procedure may require time consuming and costly movements of the synchronous generator 14, the gas turbine system 12, and/or the housing 24 on the foundation 26 and/or resizing of the foundation 26.

Embodiments of the retrofit procedure may include removing and/or opening a portion (e.g., clutch casing or clutch housing portion 44) of the power generation system housing 24 at the location of the clutch assembly 13 between the gas turbine system 12 and the synchronous generator 14. Upon obtaining access, the clutch assembly 13 may be removed and replaced with the clutchless synchronous condensing module 11 (including the clutchless synchronous condensing coupling 16). In certain embodiments, the clutch housing portion 44 is reinstalled after installation of the clutchless synchronous condensing module 11. In other embodiments, the clutchless synchronous condensing module 11 has its own integrated housing and thus is self-contained and ready for operation upon installation in the space previously occupied by the clutch assembly 13.

As discussed below, the clutchless synchronous condensing module 11 may include a variety of supplemental components 15, 17, 19, and 21 to support clutchless synchronous condensing. For example, the clutchless synchronous condensing module 11 may include a controller 15 having a processor, a memory, and instructions stored on the memory and executable by the processor to perform various tasks associated with the clutchless synchronous condensing. In certain embodiments, the controller 15 may enable updates of a main controller (e.g., 78, FIG. 2) of the power generation system 10 to provide the computer instructions suitable to perform the clutchless synchronous condensing. Furthermore, in certain embodiments, the controller 15 may enable local monitoring and/or control of the clutchless synchronous condensing module 11 (including the clutchless synchronous condensing coupling 16) and the other components 17, 19, and 21. The components 17 may include, for example, all or part of a sump evacuation system 72 as discussed in further detail below with reference to FIG. 2. The components 19 may include, for example, one or more sensors dedicated to monitor aspects impacting the clutchless synchronous condensing, including sensors that monitor operational parameters of a power grid (e.g., grid frequency) and one or more operational parameters of the synchronous generator 14, the turbine 22, and/or the clutchless synchronous condensing coupling 16 (e.g., a rotational speed, a torque, a vibration level, an acoustic noise, an alignment of rotational axes, or any combination thereof). The controller 15 and/or 78 is responsive to feedback from the one or more sensors to control operation of the gas turbine system 12 to transition the power generation system 10 between an active power mode and a reactive power mode using the clutchless synchronous condensing coupling 16 without the clutch assembly 13. Additionally, the components 21 may include, for example, a user interface or control panel configured to allow adjustments to the operation of the clutchless synchronous condensing module 11. The components 15, 17, 19, and 21 may be communicatively coupled together and may be communicatively coupled to the main controller (e.g., 78, FIG. 2) of the power generation system 10, thereby helping to complete the retrofit of the system 10 to incorporate the clutchless synchronous condensing.

Figure 2:
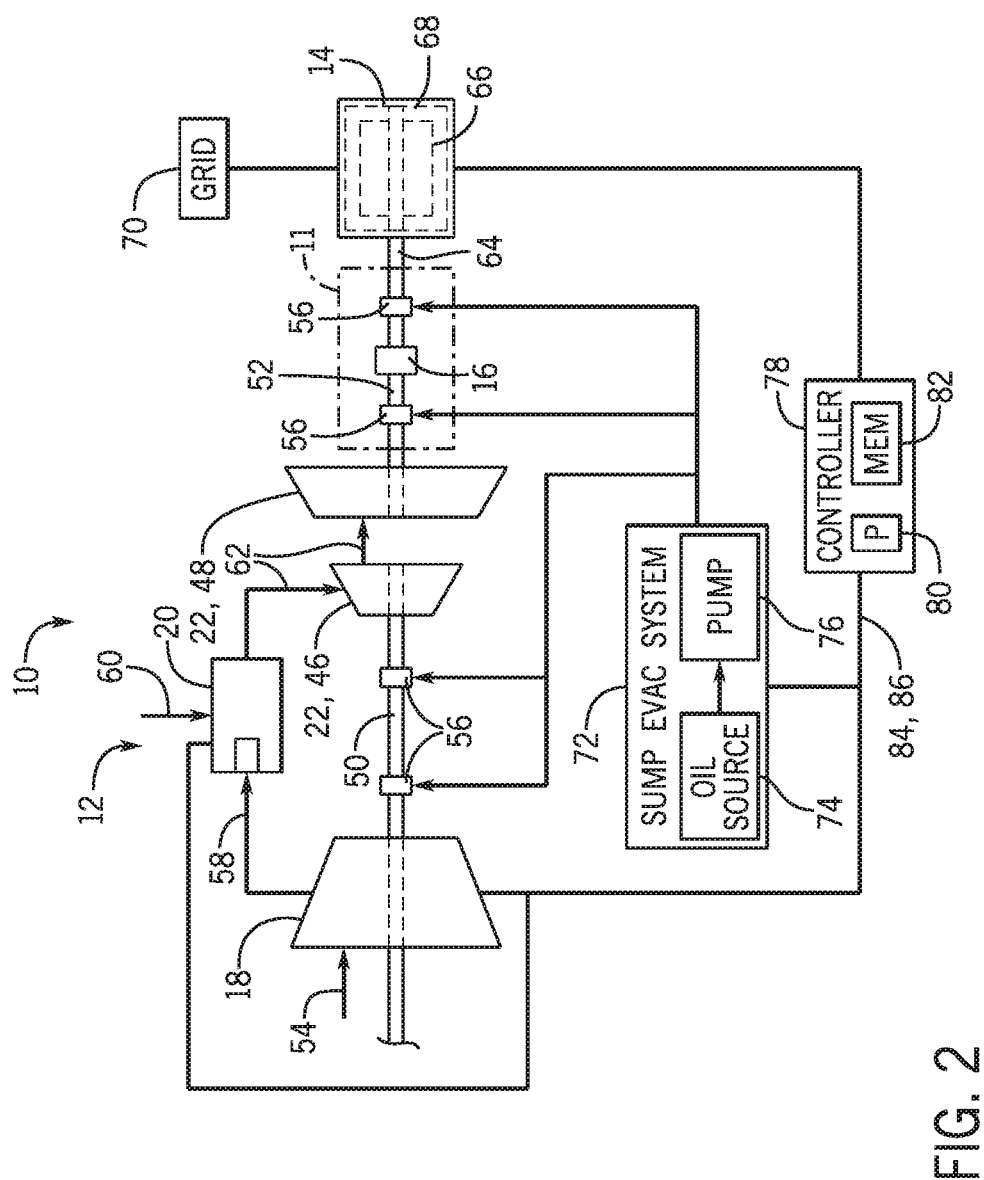
FIG. 2 is a schematic of an embodiment of the power generation system retrofitted with a clutchless synchronous condensing module as illustrated in FIG. 1.

FIG. 2 is a schematic of an embodiment of the power generation system 10 retrofitted with a clutchless synchronous condensing module 11 as illustrated in FIG. 1. The power generation system 10 includes the gas turbine system 12 coupled to the synchronous generator 14. The gas turbine system 12 includes the compressor 18, the combustor 20, and the turbine 22. In some embodiments, the gas turbine system 12 includes a high pressure gas turbine (e.g., core turbine 46) and a low pressure gas turbine (e.g., power turbine 48) disposed downstream the core turbine 46. The core turbine 46 may be configured to drive a core shaft (e.g., first turbine shaft 50), and the power turbine may be configured to drive a power shaft (e.g., second turbine shaft 52). The first turbine shaft 50 may be disposed physically separate from the second turbine shaft 52. That is, the first turbine shaft 50 is not mechanically connected to the second turbine shaft 52, and thus the first turbine shaft 50 does not mechanically drive the second turbine shaft 52.

The compressor 18 may be mechanically coupled to the first turbine shaft 50 (e.g., via a compressor shaft or compressor shaft portion of the first turbine shaft 50) and configured to receive an incoming flow of air 54 from the air intake system 34 of the power generation system 10. The first turbine shaft 50 may be supported by one or more bearings 56. The compressor 18 may include a plurality of compressor stages (e.g., 2 to 28 or more compressor stages) each having a plurality of stator vanes positioned about the compressor shaft and a plurality of compressor blades configured to rotate in response to rotation of the first turbine shaft 50. The compressor 18 may be configured to compress the incoming air flow 54 and to deliver a compressed flow of air 58 to the combustor 20.

The combustor 20 (including one or more fuel nozzles 57) may be configured to mix the compressed flow of air 58 with a pressurized flow of fuel 60 received from a fuel source and to ignite the mixture to create a flow of combustion gases 62. Although only a single combustor 20 is shown, the gas turbine system 12 may include a plurality of combustors. The combustor 20 may be configured to deliver the flow of combustion gases 62 to the core turbine 46. The core turbine 46 may include a plurality of turbine stages (e.g., 2 to 10 or more turbine stages) each having a plurality of stator vanes positioned about the first turbine shaft 50 and a plurality of turbine blades configured to rotate with the first turbine shaft 50. The flow of combustion gases 62 may drive rotation of the core turbine 46 and the first turbine shaft 50; however, the core turbine 46 itself does not drive rotation of the second turbine shaft 52. The core turbine 46 directs the flow of combustion gases 62 leaving the core turbine 46 (e.g., exhaust gases) to the power turbine 48.

The power turbine 48 is mechanically coupled to the second turbine shaft 52, but not the first turbine shaft 50. The power turbine 48 is configured to receive the flow of combustion gases 62 (e.g., exhaust gases) from the core turbine 46. The second turbine shaft 52 may be supported by the one or more bearings 56. The power turbine 48 may include a plurality of stator vanes positioned about the second turbine shaft 52 and a plurality of turbine blades coupled to and configured to drive rotation of the second turbine shaft 52. The flow of combustion gases 62 from the core turbine 46 may drive the power turbine 48, producing mechanical work. The mechanical work produced by the power turbine 48 (i.e., due to combustion gases 62 driving rotation of the power turbine 48) may drive the synchronous generator 14 when the power generating system 10 is operated in an active power mode (or synchronous generating mode of the generator 14). That is, mechanical work produced by the power turbine 48 may drive the second turbine shaft 52. The clutchless synchronous condensing coupling 16 may be configured to couple the second turbine shaft 52 to a generator shaft 64, such that torque is transferred between the second turbine shaft 52 and the generator shaft 64. The torque from the second turbine shaft 52 is transferred to the generator shaft 64 causing the generator shaft 64 to rotate. The rotation of the generator shaft 64 drives the synchronous generator 14, such that the power turbine 48 may drive the synchronous generator 14 (i.e., synchronous generating mode) when the power generating system 10 is operated in the active power mode.

The synchronous generator 14 may include a generator rotor 66 mounted within a generator stator 68. The generator shaft 64 is coupled to the generator rotor 66 and is configured to rotate therewith. The generator shaft 64 may be supported by the one or more bearings 56. The generator rotor 66 may be wrapped in field windings, and the generator stator 68 may be wrapped in armature windings. Thus, rotating the generator shaft 64 of the synchronous generator 14 may provide active power to a power grid 70 in the active power mode of the power generation system 10. As set forth above, the synchronous generator 14 is configured be driven by the generator shaft 64 to provide active power in the active power mode. In a reactive power mode of the power generation system 10, the synchronous generator 14 operates as a synchronous condenser in a synchronous condensing mode, as needed, to maintain a power factor on the power grid 70. The synchronous generator 14 may be configured to drive the generator shaft 64 in the reactive power mode to generate reactive power or absorb reaction power in a reactive power mode to maintain the power factor on the power grid 70 in the reactive power mode. Thus, the synchronous generator 14 may operate as a synchronous generator 14 in the active power mode and a synchronous condenser in the reactive power mode. In the reactive power mode, the synchronous generator 14 (operating as a synchronous condenser in a synchronous condensing mode) is configured to spin freely to adjust conditions on the power grid 70 while rotating the generator shaft 64 and the power turbine 48; however, the free rotation of the synchronous condenser does not drive rotation of the core turbine 46 due to the lack of a mechanical connection between the core turbine 46 and the power turbine 48. The synchronous condensing is therefore possible without requiring a clutch for selectively connecting and disconnecting the synchronous generator 14 and the turbine 22.

As set forth above, the one or more bearings 56 may be configured to support the first turbine shaft 50, the second turbine shaft 52, the generator shaft 64, the clutchless synchronous condensing coupling 16, or some combination thereof. A sump evacuation system 72 may be configured to provide a lubricant (e.g., oil) to the one or more bearings 56, as well as to other portions of the power generation system 10. The sump evacuation system 72 may include an oil source 74 configured to store and/or provide the lubricant for operation of the sump evacuation system 72. In some embodiments, the sump evacuation system 72 is configured to maintain a differential pressure across the one or more bearings 56 (e.g., lubricant seals of the bearings).

The sump evacuation system 72 may utilize internal pressure from operation of the gas turbine system 12 to circulate the lubricant in the active power mode. In the active power mode, the core turbine 46 of the gas turbine system may be configured to operate above 8,000 RPMs, which provides sufficient internal pressure for the sump evacuation system 72 to circulate the lubricant. However, during the reactive power mode, the core turbine 46 may be shut down or operate at a substantially lower RPM (e.g., less than 2500 RPM). To maintain circulation of the lubricant, the power generation system 10 includes a pump 76 (or multiple pumps) for the sump evacuation system 72 installed during the retrofit. In certain embodiments, the pump 76 and/or the sump evacuation system 72 may be one of the components (e.g., component 17) of the clutchless synchronous condensing module 11 (e.g., part of the packaged system), or the pump 76 may be packaged separately and/or with the sump evacuation system 72. The pump 76 may be configured to provide additional pressure for circulating the lubricant. In certain embodiments, the pump 76 may be configured to operate only in the reactive power mode. In some embodiments, the pump 76 also may be configured to supplement the internal pressure driving circulation of the lubricant during the active power mode. However, in either case, the pump 76 may be part of the retrofit associated with the clutchless synchronous condensing module 11. Additionally, the retrofit may include controller upgrades to enable operation of the pump 76 with the clutchless synchronous condensing module 11.

The power generation system 10 may include a controller 78 configured to control operation of the power generation system 10 (e.g., cause system to operate in the active power mode or the reactive power mode) via a processor 80 and a memory 82. The controller 78 may be a main controller and/or a separate controller from the controller 15 as described above, the controllers 15 and 78 may operate together to control various aspects of the power generation system 10, the controllers 15 and 78 may be integrated together as a single controller, or one or both of the controllers 15 and 78 may be configured to operate the power generation system 10 in the active power mode and the reactive power mode, including aspects specific to the clutchless synchronous condensing module 11. Any control features described with respect to either of the controllers 15 and 78 is intended to include control features incorporated into one or both of the controllers 15 and 78. Therefore, the following discussion of control features may refer only to the controller 78, but is intended to also cover control features of the controller 78 in certain embodiments.

The processor 80 of the controller 78 may include one or more processing devices, and the memory 82 may include one or more tangible, non-transitory, machine-readable media. By way of example, such machine-readable media can include RAM, ROM, EPROM, EEPROM, or optical disk storage, magnetic disk storage or other magnetic storage devices, or any other medium which can be used to carry or store desired program code in the form of machine-executable instructions or data structures and which can be accessed by the processor 80 or by other processor-based devices (e.g., mobile devices). In some embodiments, the memory 82 is configured to store controller instructions executable by the processor 80 to output various controller signals 84. For example, the processor 80 may execute the controller instructions to control operation of the gas turbine system 10.

The controller 78 (via the processor 80) and/or the controller 15 (via a processor) may execute controller instructions to control operation of the sump evacuation system 72. For example, the controller 78 and/or 15 may be configured to deactivate the pump 76 in the active power mode and activate the pump 76 in the reactive power mode. In some embodiments, the controller 78 and/or 15 may be configured to control operation of the sump evacuation system 72 based at least in part on user input via a user interface, such as the user interface of the component 21 of the clutchless synchronous condensing module 11 as described above. The user interface may include an input/output device (e.g., keyboard, mouse, or touch screen) configured to provide the user input to the controller 78 and/or 15. Further, the user interface may include a display (e.g., computer monitor or personal device screen) configured to display user options for the controller 78 and/or 15.

Moreover, the controller 78 (or the controller 15) may be configured to output the various controller signals 84 via communications circuitry 86. The communications circuitry 86 may include a wired connection and/or wireless communication circuitry. For example, the communications circuitry 86 may include antennas, radio transceiver circuits, and signal processing hardware and/or software (e.g., hardware or software filters, A/D converters, multiplexers, amplifiers), or a combination thereof, and that may be configured to communicate over wireless communication paths via infrared (IR) wireless communication, satellite communication, broadcast radio, microwave radio, Bluetooth, Zigbee, Wifi, UHF, NFC, etc.

In some embodiments, the controller 78 and/or 15 of the gas turbine system 12 is configured to maintain a minimum operation speed (e.g., rotations per minute) of the first turbine shaft 50 and the core turbine 46 in the reactive power mode. Maintaining a minimum speed of the core turbine 46 may prevent wind milling of the core turbine 46 caused by the rotation of the power turbine 48 disposed adjacent the core turbine 46. In some embodiments, the core turbine 46 of the power generation system 10 is configured to operate between 1000 rotations per minute (RPM) and 2500 RPM in the reactive power mode. In some embodiments, the core turbine 46 is configured to operate between 1500 RPM and 3000 RPM in the reactive power mode.

Figure 3:
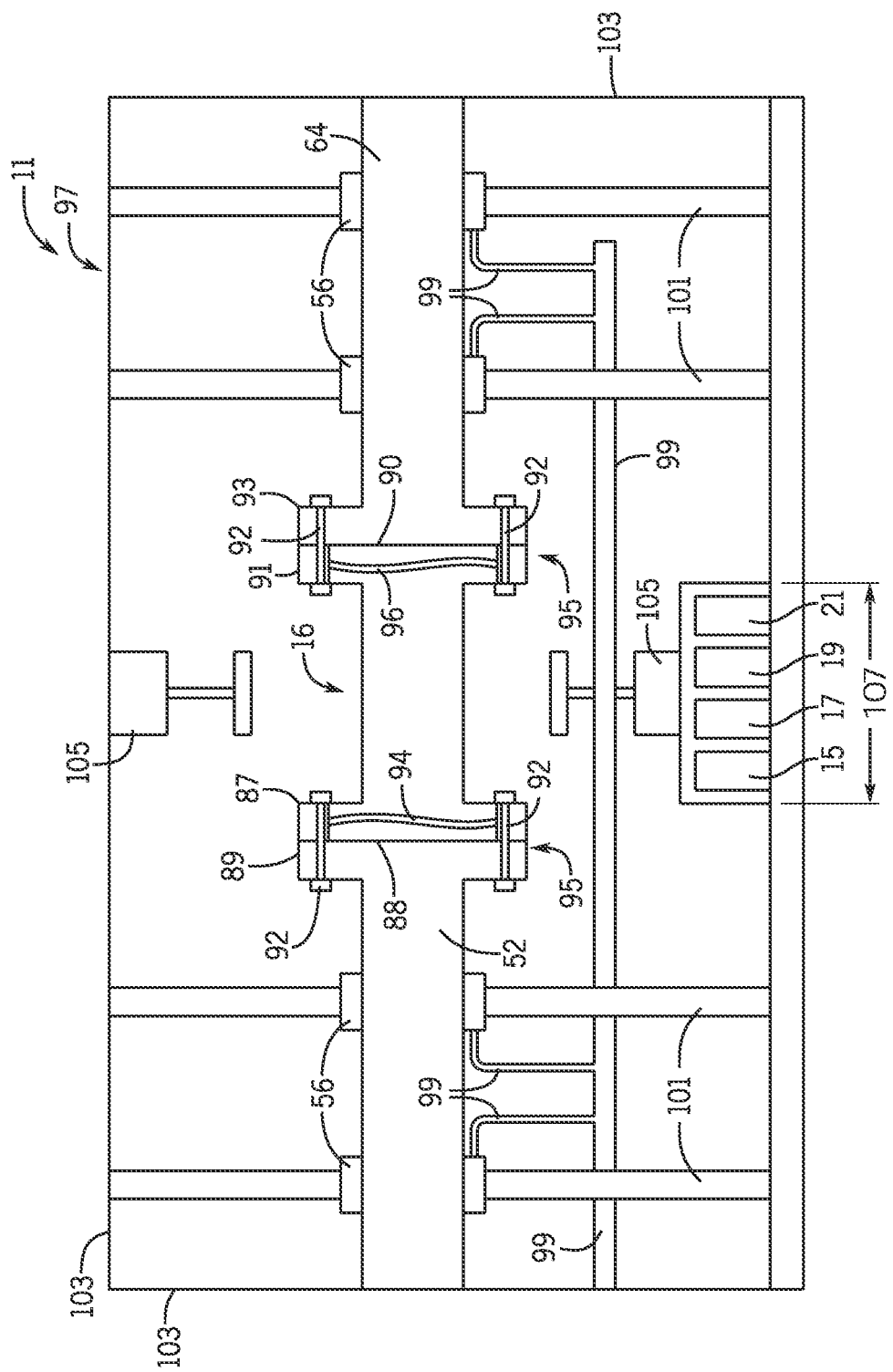
FIG. 3 is a side view of an embodiment of the clutchless synchronous condensing module 11 as illustrated in FIGS. 1 and 2.

FIG. 3 is a side view of an embodiment of the clutchless synchronous condensing module 11 as illustrated in FIGS. 1 and 2. As discussed above, the module 11 having the clutchless synchronous condensing coupling 16 is configured to replace the clutch assembly 13 as part of the retrofit for the power generation system 10. The clutchless synchronous condensing coupling 16 may be configured to couple the second turbine shaft 52 to the generation shaft 64, such that torque may be transferred between the second turbine shaft 52 and the generator shaft 64. Specifically, the clutchless synchronous condensing coupling 16 may be configured to transfer torque from the second turbine shaft 52 to the generator shaft 64 in the active power mode of the power generation system 10, and also transfer torque from the generator shaft 64 to the second turbine shaft 52 in the reactive power mode of the power generation system 10.

In some embodiments, a first coupling portion or a first end portion 88 of the clutchless synchronous condensing coupling 16 is configured to fasten to the second turbine shaft 52. Further, a second coupling portion or a second end portion 90 of the clutchless synchronous condensing coupling 16 is configured to fasten to the generator shaft 64. For example, the first end portion 88 may include a first flange 87 (e.g., annular flange) coupled to a first mating flange 89 (e.g., annular flange) with one or more fasteners 92, and the second end portion 90 may include a second flange 91 (e.g., annular flange) coupled to a second mating flange 93 (e.g., annular flange) with one or more fasteners 92. The fasteners 92 may include one or more removable fasteners, such as a plurality of threaded fasteners (e.g., threaded bolts, nuts, etc.), clamps, pins in slots, dovetail joints, or any combination thereof. Alternatively or additionally, the fasteners 92 may include one or more fixed or permanent joints, such as welded joints. The connections between the flanges 87 and 89 and the flanges 91 and 93 also may include torque transfer features, such as a plurality of teeth that mate with a corresponding plurality of grooves (e.g., on opposing end faces of the flanges). For example, the torque transfer features may include a hirth coupling, a diaphragm coupling, a grid coupling, a disc coupling, or any combination thereof. In the illustrated embodiment, the torque transfer features include at least a diaphragm coupling 95 at the connection of the flanges 87 and 89 and at the connection of the flanges 91 and 93.

The diaphragm couplings 95 of the clutchless synchronous condensing coupling 16 may include a first diaphragm 94 disposed proximate the first end portion 88 of the coupling 16 and a second diaphragm 96 disposed proximate the second end portion 90 of the coupling 16. The first diaphragm 94 and the second diaphragm 96 may be configured to accommodate misalignment between the second turbine shaft 52 and the generator shaft 64. That is, the first diaphragm 94 and the second diaphragm 96 are configured to compensate the axial, radial and angular offset of the second turbine shaft 52 and the generator shaft 64. The first diaphragm 94 and the second diaphragm 96 each may include one or a plurality of flexible metal diaphragms, discs, or plates disposed within respective portions of the clutchless synchronous condensing coupling 16 and configured to flex during rotation of the second turbine shaft 52 and the generator shaft 64 to accommodate misalignment between the second turbine shaft 52 and the generator shaft 64. The diaphragms 94 and 96 of the diaphragm couplings 95 are configured to transfer torque from an outside diameter to an inside diameter and/or from the inside diameter to the outside diameter of the flexible metal diaphragms, discs, or plates. The diaphragm couplings 95 may include tapered contoured, multiple straight diaphragms with spokes, and/or multiple convoluted diaphragms. The diaphragm couplings 95 of the clutchless synchronous condensing coupling 16 may substantially reduce or eliminate maintenance as compared with the clutch assembly 13. For example, the diaphragm couplings 95 may not require any lubrication and may have a substantially longer life than the clutch assembly 13, thereby avoiding potential downtime for repair or replacement. Accordingly, the diaphragm couplings 95 may be considered lubricant free, self-aligning or self-adjusting for misalignments between shafts, and maintenance free.

In the illustrated embodiment, the clutchless synchronous condensing module 11 includes a housing or framework 97 supporting and/or enclosing the clutchless synchronous condensing coupling 16 having two of the diaphragm couplings 95, the components 15, 17, 19, and 21, the bearings 56 disposed about a portion of the second turbine shaft 52, the bearings 56 disposed about a portion of the generator shaft 64, and one or more lubricant supply conduits 99 configured to supply a lubricant (e.g., oil) to the bearings 56 (e.g. via the system 72). Additionally, in some embodiments, the housing or framework 97 of the clutchless synchronous condensing module 11 may support the pump 76 and/or additional components or all of the sump evacuation system 72 as noted above. Although the illustrated embodiments of the clutchless synchronous condensing module 11 includes the bearings 56, some embodiments of the module 11 may exclude the bearings 56 and/or the housing or framework 97 may be sized based on an axial length of the clutchless synchronous condensing coupling 16 extending to the flanges 87 and 91 and the diaphragm couplings 95, as indicated an axial length 107. For example, the axial length 107 of the housing or framework 97 may be approximately 80 to 120 percent, 90 to 110 percent, or about 100 percent of an axial length of the coupling 16. The housing or framework 97 may include an inner framework 101 surrounded by one or more outer housing panels 103, which may include one or more removable housing panels configured to facilitate installation and inspection. The module 11 also may include one or more installation/removal tools 105 (e.g., upper tool and/or lower tool), which may be configured to help lift and/or lower the coupling 16, align the coupling 16 with the shafts 52 and 64, or any combination thereof. For example, the tools 105 may include motor driven tools, hydraulic tools, pneumatic tools, or a combination thereof. Furthermore, the tools 105 may include mechanical supports (e.g., support bars, cables, chains, etc.), which may be moved into an appropriate position to support the coupling 16 during installation and/or removal. These tools 105 may be packaged with the module 11 to facilitate an efficient installation of the module 11 during a retrofit procedure. In certain embodiments, the tools 105 may be used to remove the clutch assembly 13 as well. However, in some embodiments, the tools 105 may be excluded from the module 11.

Figure 4:
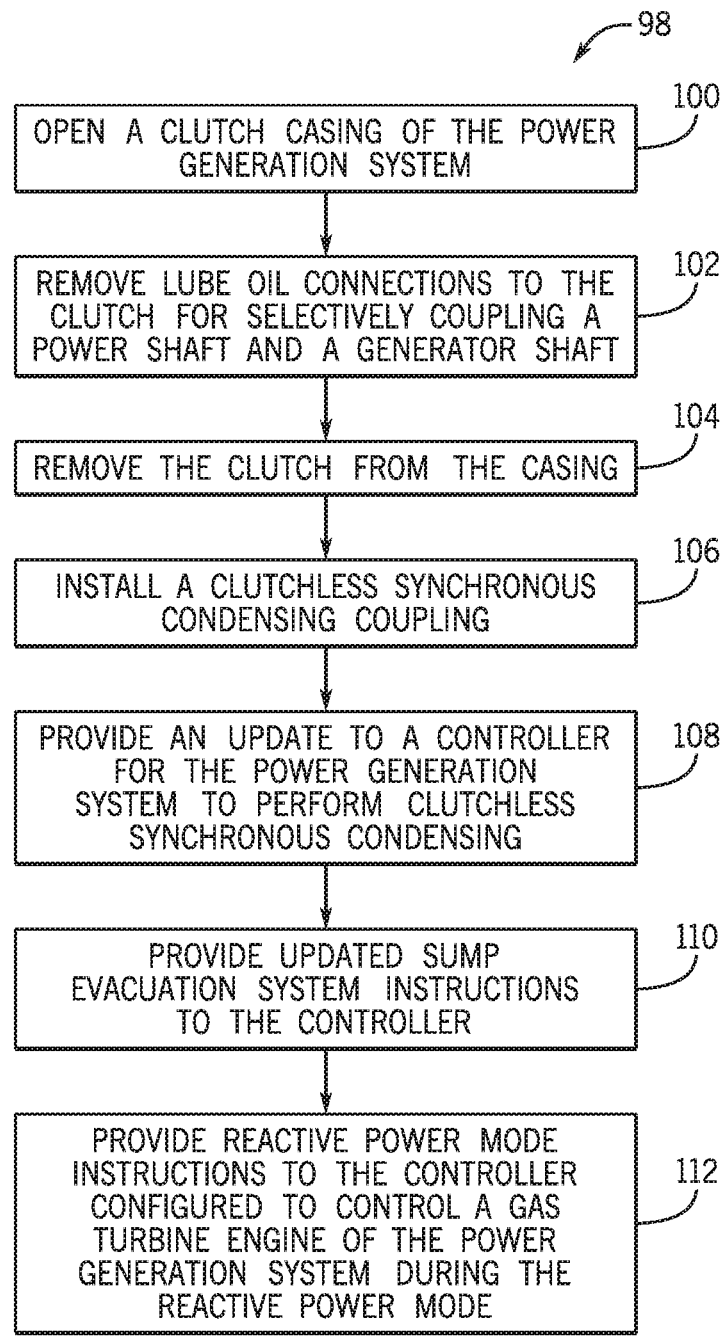
FIG. 4 is a flow chart of an embodiment of a process for retrofitting a power generation system to incorporate a clutchless synchronous condensing module as illustrated in FIGS. 1-3.

FIG. 4 is a flow chart of an embodiment of a process 98 for retrofitting a power generation system 10 to incorporate a clutchless synchronous condensing module 11 as illustrated in FIGS. 1-3. For purposes of discussion of the process 98, the power generation system 10 and the clutchless synchronous condensing module 11 are substantially the same as described above with reference to FIGS. 1-3. For example, the retrofitting steps of the process 98 may correspond to the retrofitting shown in FIG. 1, wherein the clutch assembly 13 is replaced with the clutchless synchronous condensing module 11. Accordingly, the power generation system 10 includes the synchronous generator 14 configured to generate active power to a power grid in an active power mode and generate reactive power or absorb reaction power in a reactive power mode to maintain the power factor on the power grid. The retrofitting process is configured to enable a clutchless synchronous condensing operation of the power generation system 10.

The process 98 for retrofitting the power generation system 10 includes the step of opening a clutch casing 44 of the power generation system (block 100). The clutch casing 44 may be a portion of the power generation system housing 24. Opening the clutch casing 44 may include opening a side portion or top portion of the power generation system housing 24 disposed proximate the clutch assembly 13, such that an operator performing the retrofit has access to the clutch assembly 13. In some embodiments, the operator may open a pre-existing opening via an access panel (e.g., hinged panel).

The process 98 further includes the step of removing lube oil connections to the clutch assembly 13 for selectively coupling a second turbine shaft 52 (e.g., of the power turbine 48) and a generator shaft 64 (block 102). However, the operator may leave connected lube oil connections to one or more bearings 56 disposed proximate the clutch assembly 13. The retrofitted power generation system 10 may incorporate the one or more bearings 56 to support the second turbine shaft 52, the generator shaft 64, or some combination thereof.

The process 98 includes the step of removing the clutch assembly 13 from the clutch casing 44 (block 104). The clutch assembly 13 may include a plurality of clutch components, such as a flywheel, a pressure plate, pressure springs, releasing levers, a clutch housing, a clutch plate, a clutch actuator and controls, as well as other suitable components. Removing the clutch assembly 13 from the clutch casing 44 may include removing the clutch assembly 13 as an assembled unit or in a sequence of components of the clutch assembly 13.

The process 98 includes the step of installing the clutchless synchronous condensing coupling 16 (e.g. the clutchless synchronous condensing module 11) into the space previously occupied by the clutch assembly 13 (block 106). As set forth above, in some embodiments, the entire clutch assembly 13 is removed such that the clutchless synchronous condensing coupling 16 (e.g., module 11) may be installed directly between the second turbine shaft 52 and the generator shaft 64. As such, installing the clutchless synchronous condensing coupling 16 (e.g., module 11) may include directly attaching a first end portion 88 of the clutchless synchronous condensing coupling 16 to the second turbine shaft 52 and directly attaching a second end portion 90 of the clutchless synchronous condensing coupling 16 to the generator shaft 64. However, in other embodiments, one or more components of the clutch assembly 13 (i.e., not retaining the functionality of the clutch) may remain attached to the second turbine shaft 52, the generator shaft 64, the housing 24, the foundation 26, or some combination thereof, particularly if these components are fixed in place and/or will not adversely impact installation of the clutchless synchronous condensing coupling 16 (e.g., module 11). In these embodiments, the first end portion 88 and/or the second end portion 90 of the clutchless synchronous condensing coupling 16 may be configured to couple to one or more remaining components of the clutch assembly 13 (i.e., not retaining functionality of the clutch) attached to the second turbine shaft 52 and/or the generator shaft 64.

The process 98 includes the step of providing an update (e.g., updated firmware or software instructions—controller updates) to a controller 78 for the power generation system 10 to perform clutchless synchronous condensing (block 108). Providing the update to the controller 78 may include providing updated sump evacuation system instructions to the controller (block 110). As set forth in detail below, the updated sump evacuation system instruction may be configured to deactivate the pump 76 during an active power mode of the power generation system 10 and activate the pump 76 during a reactive power mode of the power generation system 10.

Moreover, providing an update to the controller 78 may include providing reactive power mode instructions to the controller 78 configured to control a gas turbine system 12 of the power generation system 10 during the reactive power mode (block 112). The reactive power mode instructions may be configured to maintain a minimum operation speed (e.g., rotations per minute) of the turbine shaft in the reactive power mode to prevent wind milling of the core turbine 46. The reactive power mode instructions may be configured to cause the power generation system 10 to operate between 1000 rotations per minute (RPM) and 2500 RPM in the reactive power mode. In some embodiments, the reactive power mode instructions may be configured to cause the power generation system 10 to operate between 1500 RPM and 3000 RPM in the reactive power mode. The reactive power mode instructions may be configured to cause the power generation system 10 to operate at a predetermined RPM configured to prevent wind milling of the core turbine 46.

Figure 5:
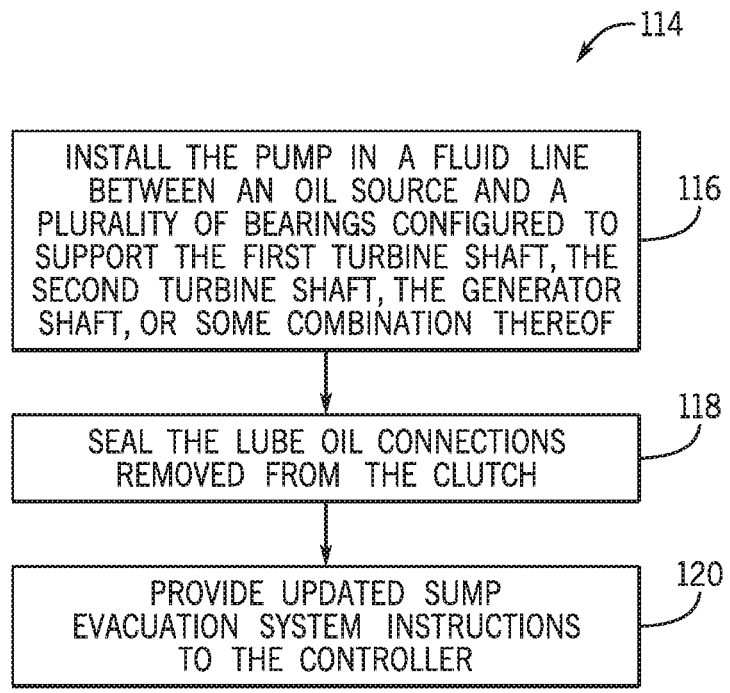
FIG. 5 is a flow chart of an embodiment of a process for updating operation of a sump evacuation system as part of a retrofit of a power generation system to incorporate a clutchless synchronous condensing module.

FIG. 5 is a flow chart of an embodiment of a process 114 for updating operation of the sump evacuation system 72 as part of a retrofit of a power generation system 10 to incorporate a clutchless synchronous condensing module 11. For purposes of discussion of the process 114, the power generation system 10 and the clutchless synchronous condensing module 11 are substantially the same as described above with reference to FIGS. 1-3. For example, the retrofitting steps of the process 114 may correspond to the retrofitting shown in FIG. 2, wherein the sump evacuation system 72 is modified to incorporate a pump 76. As discussed above, during the reactive power mode of the power generation system 10, the gas turbine system 12 may operate at a lower RPM than during the active power mode. As such, the gas turbine system 12 may produce less pressure to circulate oil through the sump evacuation system 72. In some embodiments, the pressure provided to the sump evacuation system 72 in the reactive power mode may be too low to fully circulate the oil through the sump evacuation system 72, such that excess oil may heat over time and generate residue that may clog the sump evacuation system 72. The process 114 for updating operation of the sump evacuation system 72 may provide the power generation system 10 with additional pressure to properly circulate the oil through the sump evacuation system 72.

The process 114 includes the step of installing the pump 76 in a fluid line between a lubricant source (e.g., oil source) and a plurality of bearings 56 configured to support the first turbine shaft 50, the second turbine shaft 52, the generator shaft 64, or some combination thereof (block 116). The pump 76 may be a positive displacement pump configured to move the lubricant (e.g., oil) from the oil source toward the plurality of bearings 56, as well as other lubricant flow paths through the gas turbine system 12 and/or the synchronous generator 14. The pump 76 may be configured to provide sufficient pressure within the sump evacuation system 72 to circulate the lubricant through the sump evacuation system 72, the bearings 56, and the various lubricant flow paths.

The process 114 includes the step of sealing the lube oil connections removed from the clutch assembly 13 (block 118). In some embodiments, at least some of the lube oil connections removed from the clutch assembly 13 may not be connected for the retrofitted power generation system 10. Unconnected lube oil connections may leak lubricant and create pressure drops in the sump evacuation system 72. Thus, the method includes the step of sealing the lube oil connections removed from the clutch assembly 72. The lube oil connections may be sealed via any suitable seal, e.g., a cap, plug, welded joint, crimp, or a combination thereof.

The process 114 further includes the step of providing updated sump evacuation system instructions (e.g., updated firmware or software instructions—controller updates) to the controller 78 (block 120). The updated sump evacuation system instructions may be configured to deactivate the pump 76 during an active power mode of the power generation system 10 and activate the pump 76 during a reactive power mode of the power generation system 10. As set forth above, the pressure provided to the sump evacuation system 72 in the reactive power mode may be too low to fully circulate the oil through the sump evacuation system 72, such that excess oil may heat over time and generate residue that may clog the sump evacuation system 72. Providing updated sump evacuation system instructions to cause the sump evacuation system 72 to activate the pump 76 in the reactive power mode may provide the power generation system 10 with sufficient additional pressure to properly circulate the oil through the sump evacuation system 72.

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
a clutchless synchronous condensing coupling configured to retrofit a power generation system by coupling a turbine shaft of a gas turbine system to a generator shaft of a synchronous generator in a space previously occupied by a clutch assembly, wherein the clutchless synchronous condensing coupling comprises:
a first coupling configured to couple to a first mating coupling of the turbine shaft, wherein the first coupling comprises a first flange, and the first mating coupling comprises a first mating flange; and
a second coupling configured to couple to a second mating coupling of the generator shaft, wherein the second coupling comprises a second flange, the second mating coupling comprises a second mating flange, and the clutchless synchronous condensing coupling extends an axial length between the first coupling and the second coupling;
wherein the clutchless synchronous condensing coupling comprises at least one diaphragm coupling, and the clutchless synchronous condensing coupling is configured to allow the power generation system to operate in an active power mode and a reactive power mode without the clutch assembly.

2. The system of claim 1, comprising a retrofit kit configured to retrofit the power generation system previously equipped with the clutch assembly to operate without the clutch assembly in the active power mode and the reactive power mode, wherein the retrofit kit comprises the clutchless synchronous condensing coupling and a controller or instructions to upgrade an existing controller of the power generation system to perform clutchless synchronous condensing.

3. The system of claim 2, comprising a pump configured to circulate a lubricant when the power generation system operates in the reactive power mode, wherein the controller or the instructions to upgrade the existing controller of the power generation system are configured to operate the pump during the reactive power mode when a pressure in the gas turbine system is insufficient to circulate the lubricant, wherein the pressure in the gas turbine system is sufficient to circulate the lubricant in the active power mode.

4. The system of claim 1, comprising a clutchless synchronous condensing module having the clutchless synchronous condensing coupling, wherein the clutchless synchronous condensing module has a base size and one or more size adjustment features configured to adjust a height, a width, or a length of the clutchless synchronous condensing module.

5. The system of claim 1, wherein the clutchless synchronous condensing coupling is configured to fit in the space previously occupied by the clutch assembly, such that the gas turbine system and the synchronous generator remain in respective installed positions on a foundation of the power generation system.

6. The system of claim 1, wherein the first coupling comprises a first diaphragm coupling of the at least one diaphragm coupling, the second coupling comprises a second diaphragm coupling of the at least one diaphragm coupling, and the first diaphragm coupling and the second diaphragm coupling are configured to accommodate misalignment between the turbine shaft and the generator shaft.

7. The system of claim 1, comprising the gas turbine system having a combustor configured to produce a flow of combustion gas, a first turbine driven by the flow of combustion gas, and a second turbine driven by the flow of combustion gas downstream from the first turbine, wherein the first turbine and the second turbine are not rotationally coupled together, wherein the turbine shaft is coupled to the second turbine, wherein the first coupling of the clutchless synchronous condensing coupling is coupled to the turbine shaft.

8. The system of claim 1, comprising a framework disposed about the clutchless synchronous condensing coupling, wherein the clutchless synchronous condensing coupling is configured to rotate within the framework.

9. The system of claim 8, wherein the framework comprises one or more housing panels, one or more first bearings to support the turbine shaft, one or more second bearings to support the generator shaft, and one or more lubricant passages to the one or more first bearings and the one or more second bearings.

10. The system of claim 1, comprising one or more sensors communicatively coupled to a controller, wherein the controller is responsive to feedback from the one or more sensors to control operation of the gas turbine system to transition the power generation system between the active power mode and the reactive power mode using the clutchless synchronous condensing coupling without the clutch assembly, wherein the synchronous generator is configured to provide an active power to a power grid in the active power mode when the synchronous generator is driven by the turbine shaft, wherein the synchronous generator is configured to generate a reactive power or absorb a reaction power in the reactive power mode when the synchronous generator operates as a synchronous condenser to drive the turbine shaft.

11. The system of claim 1, wherein the clutchless synchronous condensing coupling comprises an axial adjustment assembly configured to enable adjustments to increase or decrease the axial length of the clutchless synchronous condensing coupling.

12. The system of claim 11, wherein the axial adjustment assembly comprises expandable/contractible shaft sections.

13. The system of claim 11, wherein the axial adjustment assembly comprises spacers.

14. The system of claim 1, comprising a retrofit kit having the clutchless synchronous condensing coupling and one or more tools, wherein the one or more tools are configured to lift and/or lower the clutchless synchronous condensing coupling, align the clutchless synchronous condensing coupling with the turbine shaft and the generator shaft, or a combination thereof.

15. The system of claim 14, wherein the one or more tools are coupled to a framework of a clutchless synchronous condensing module having the clutchless synchronous condensing coupling.

16. The system of claim 1, comprising a retrofit kit having the clutchless synchronous condensing coupling and one or more plugs configured to plug one or more lubricant connections of the clutch assembly.

17. A system, comprising:
a clutchless synchronous condensing coupling configured to retrofit a power generation system by coupling a turbine shaft of a gas turbine system to a generator shaft of a synchronous generator in a space previously occupied by a clutch assembly, wherein the clutchless synchronous condensing coupling comprises:
a first coupling configured to couple to a first mating coupling of the turbine shaft, wherein the first coupling comprises a first diaphragm coupling; and
a second coupling configured to couple to a second mating coupling of the generator shaft, wherein the second coupling comprises a second diaphragm coupling, the first diaphragm coupling and the second diaphragm coupling are configured to accommodate misalignment between the turbine shaft and the generator shaft, and the clutchless synchronous condensing coupling extends an axial length between the first coupling and the second coupling;
wherein the clutchless synchronous condensing coupling is configured to allow the power generation system to operate in an active power mode and a reactive power mode without the clutch assembly.

18. A system, comprising:
a clutchless synchronous condensing coupling configured to retrofit a power generation system by coupling a turbine shaft of a gas turbine system to a generator shaft of a synchronous generator in a space previously occupied by a clutch assembly, wherein the clutchless synchronous condensing coupling comprises:
a first coupling configured to couple to a first mating coupling of the turbine shaft; and
a second coupling configured to couple to a second mating coupling of the generator shaft, wherein the clutchless synchronous condensing coupling extends an axial length between the first coupling and the second coupling;
wherein the clutchless synchronous condensing coupling is configured to allow the power generation system to operate in an active power mode and a reactive power mode without the clutch assembly; and
a framework disposed about the clutchless synchronous condensing coupling, wherein the clutchless synchronous condensing coupling is configured to rotate within the framework, wherein the framework comprises one or more housing panels, one or more first bearings to support the turbine shaft, one or more second bearings to support the generator shaft, and one or more lubricant passages configured to supply lubricant to the one or more first bearings and the one or more second bearings.

19. The system of claim 18, comprising the power generation system having the clutchless synchronous condensing coupling, the gas turbine system, and the synchronous generator.

20. The system of claim 18, wherein the first coupling comprises a first flange, the first mating coupling comprises a first mating flange, the second coupling comprises a second flange, and the second mating coupling comprises a second mating flange.

21. The system of claim 20, wherein the clutchless synchronous condensing coupling is configured to accommodate misalignment between the turbine shaft and the generator shaft.

22. The system of claim 21, wherein the clutchless synchronous condensing coupling comprises one or more flexible metal diaphragms, discs, or plates configured to flex during rotation to accommodate misalignment between the turbine shaft and the generator shaft.

\* \* \* \* \*